Nov. 24, 1931.   R. PYZEL   1,833,473
TREATMENT OF HYDROCARBON OILS
Filed June 13, 1929   2 Sheets-Sheet 1

Witness:
Stephen V. Rebora

Inventor:
Robert Pyzel
By Frank L. Belknap
Atty.

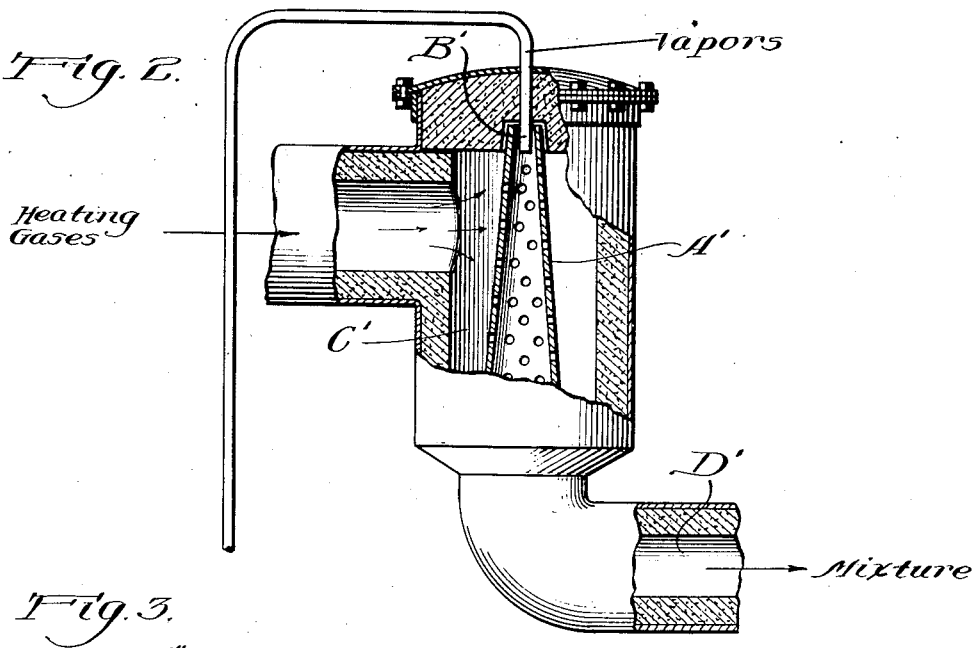
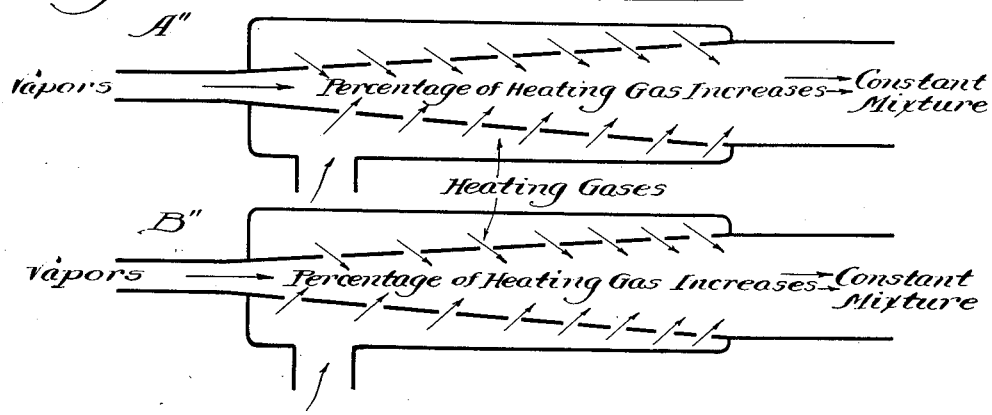
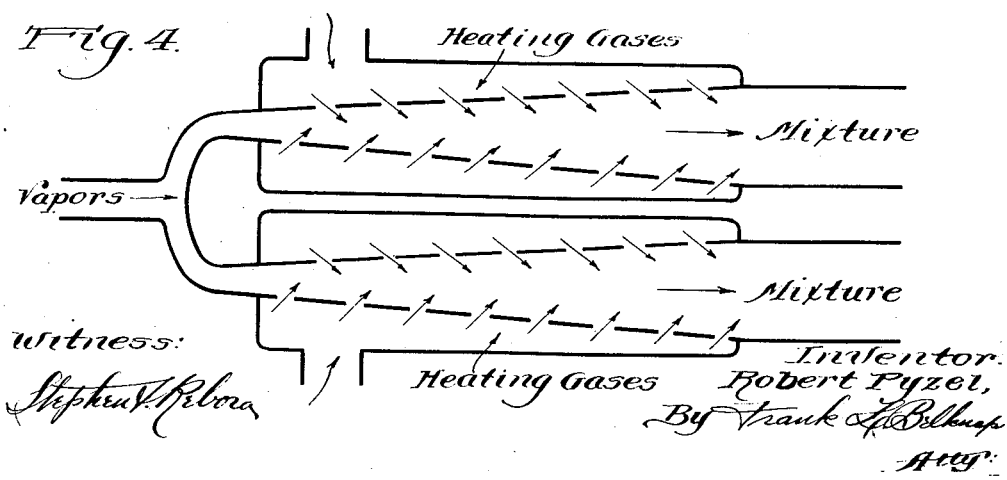

Patented Nov. 24, 1931

1,833,473

UNITED STATES PATENT OFFICE

ROBERT PYZEL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

TREATMENT OF HYDROCARBON OILS

Application filed June 13, 1929. Serial No. 370,677.

My invention relates to the treatment of hydrocarbon oils in the vapor phase.

In particular, my invention constitutes an improvement for processes wherein hydrocarbon vapors are heated to relatively high reaction temperatures by the direct addition thereto of high temperature gases. My invention contemplates a special method for bringing such vapors and gases into contact.

The use of my invention makes it possible to employ gases of very high temperatures in the above mentioned heat exchange without thereby increasing, to an appreciable extent, the formation of fixed gases and the like, during the heat exchange.

For the purpose of pointing out the special advantages which may be derived from the use of my invention I include here a general description of the type of process in which my invention may be incorporated. This type of process may be termed "vapor phase cracking process employing direct contact heat exchange to establish high reaction temperatures". Essentially, such processes comprise preheating the charge to the vapor phase reaction zones by heat exchange with the efflux from such zones; further preheating in a tubular furnace; separation of the liquid from the vapors; removal of the separated liquid from the process; combining the preheated vapors with high temperature gases (whereby the high reaction temperature is established); passing the mixture of vapors and gases through a time zone; subjecting the mixture leaving the time zone to heat exchange with a colder material (such as the charge to the process); removing the heavy, high boiling reaction products which may be condensed as a result of the lowering of temperature effected by the colder material; thereafter collecting the desirable products formed in the reaction zones and returning the intermediate products (which should be further converted) to the higher temperature zones.

Certain auxiliary equipment is required with this type of process. The exhaust gases, consisting mostly of the heating gases, but also containing some fixed hydrocarbon gases formed as a product of the cracking reaction, will carry a certain amount of material collectible as liquid by condensation. Due to the large volume of exhaust gases a considerable quantity of material will thus be lost unless special means for its collection is employed, such as a pressure absorption system or equivalent instrumentality.

After absorption a part of the exhaust gases may, if desired, be returned to the heating gas producing zone to assist in the production of the high temperature gases.

I have appended to this specification drawings, in which

Fig. 1 presents a schematic flow diagram of the type of process outlined above.

Fig. 2 shows a side elevational view, partly in section, of apparatus suitable for carrying out my invention.

Figs. 3 and 4 are diagrammatic illustrations of certain special conditions.

Figure 1:
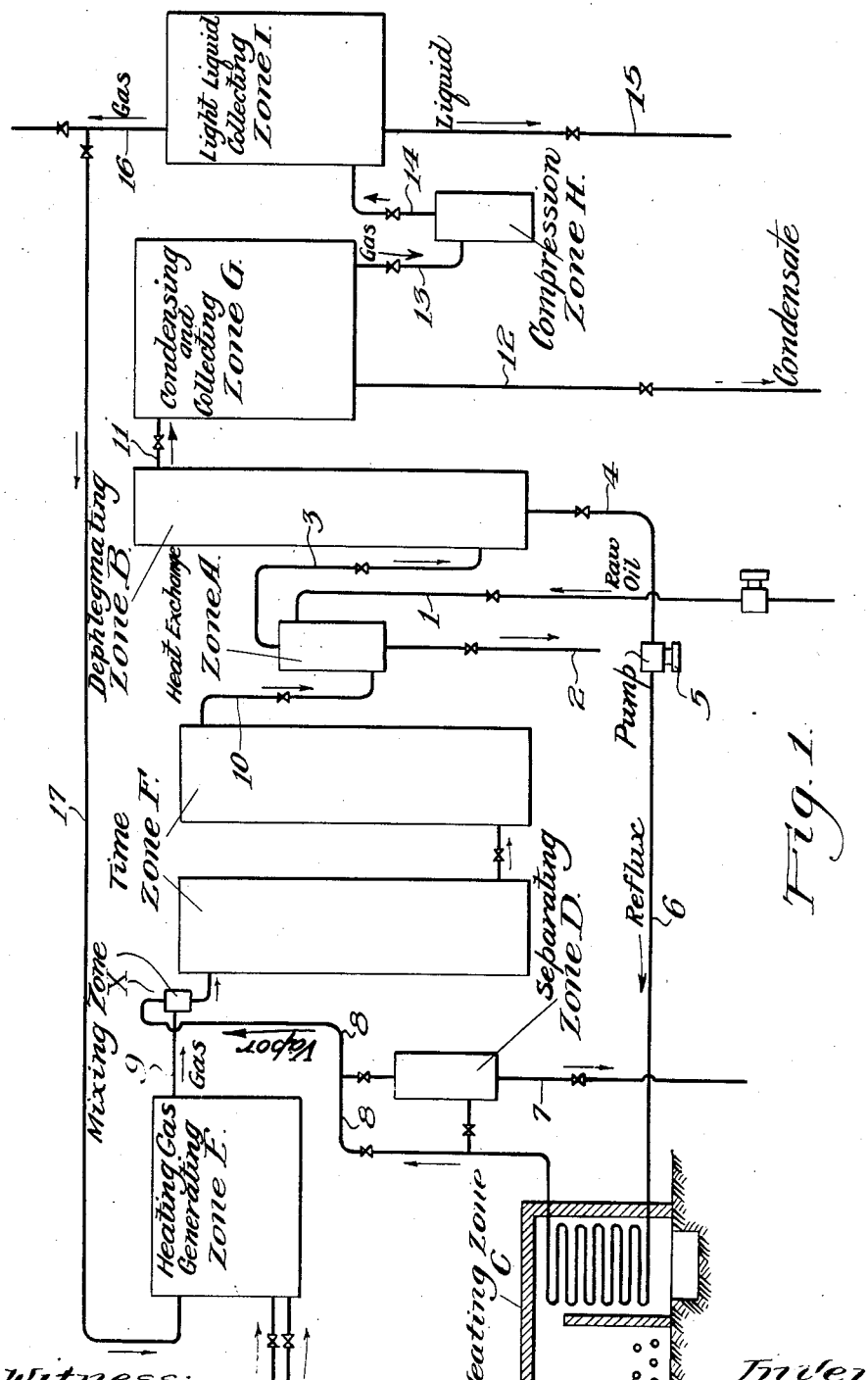

Referring to Fig. 1, the raw oil may be charged through line 1 to the separator-heat exchanger A. The efflux from time zone F enters the apparatus A through line 10. The efflux from the so-called time zone F is entirely in the vapor or gaseous phase. Heat exchange takes place whereby the heavy, high boiling hydrocarbons in the efflux are condensed to a liquid, which is withdrawn from the zone A and removed from the process through line 2. The raw oil is entirely, or partially vaporized due to the heat exchange; any part of the raw oil which is not vaporized leaves the zone A through line 2. The vaporized raw oil and the efflux from the time zone minus high boiling constituents, pass through line 3 to the dephlegmating zone B. In this zone condensation of the vaporized raw oil and the intermediate reaction products from the zone F takes place. The liquid thus formed passes through line 4, pump 5, and line 6 to the heating tubes located in a suitable furnace, as indicated at C.

If the material can not be completely vaporized by means of the heating equipment C it may be passed through a separator D where the unvaporized portion is separated and removed through line 7. If complete vaporization can be accomplished, the separator D may be by-passed by obvious manipulation of the valves shown. The vapors are conducted through line 8 to the point X where they are combined with high temperature gases which are conducted to the point X by means of line 9 from the apparatus producing the high temperature heating gases, indicated at E. The mixture of vapors and gases, now at the desired high reaction temperature, passes through time zone F and then through line 10 to zone A. The performance of zone A has been outlined above.

As pointed out, in the dephlegmating zone B the raw oil and the intermediate reaction products are condensed and are passed from this zone to the heating zone C. The material which is not condensed in the dephlegmating zone B passes through line 11 to the collecting zone G. The material which passes to the collecting zone G will consist of the heating gases, the fixed hydrocarbon gases formed as a result of the reaction, and the condensable light reaction products, which latter constitute substantially the light products desired. Cooling and scrubbing takes place in the collection zone G whereby the light products are condensed and these leave the process through line 12. The gases, which will yet contain some of the light products, may pass through line 13 to a compression zone H, and from the zone H through line 14 to a zone I where the remaining light products carried by the gases are collected. These light products leave the zone I through line 15 while the gases leave the zone I through line 16. A part of these gases may be passed through line 17 to the zone E where they are used for the production of the high temperature heating gases.

It must be understood that the general system as outlined above may be considerably modified without thereby changing its susceptibility to very substantially improved operation as a result of the use of my invention in its connection.

In this type of process my invention concerns in particular the point X, the point at which the vapor stream and the heating gas stream are combined.

The heat exchange considered in connection with my invention consists of the direct addition of high temperature gases to hydrocarbon vapors in such relative quantities that the resulting mixture of vapors and gases will attain the desired reaction temperature. It is, of course, necessary that the temperature of the heating gases be considerably higher than the temperature of the completed mixture of vapors and gases, and the higher the temperature of the heating gases the smaller the quantity required for the desired heat exchange and, therefore, the smaller the volume of the mixture and the smaller the volume of material to be handled in the process relative to the quantity of charging stock. In fact, the volume of the mixture is nearly inversely proportional to the temperature difference between the heating gases and the completed mixture. For the purpose of illustrating this point assume the following figures:

Vapors: mol. wt.=240 sp. ht.=.6
vapor temperature=800° F. mixture temperature=1000° F.
temperature increase=200° F.

Heating gases: mol. wt.=40 sp. ht.=.3
heating gas temperature=1200° F. mixture temperature=1000° F.
temperature decrease=200° F.

According to these figures the temperature increase of the vapors equals the temperature decrease of the heating gases. Therefore, the required relative weight of heating gases to vapors equals approximately 2 to 1, since the specific heat of the vapors is twice that of the heating gases. The volume relationship of heating gases to vapors for equal weights equals 6 to 1 (molecular weights 40 to 240). Thus, the volume relationship in the above heat exchange will be 12 volumes of heating gases to 1 volume of vapors. Now, assume a heating gas temperature of 1400° F. The decrease in temperature will then be 400° F. instead of 200° F., and only half the quantity of heating gases will be required. Therefore, the volume relationship of heating gas to vapors will, in the second case, be 6 to 1.

I may summarize as follows:

| Vapor temp. | Temp. of mixture | Temp. of heating gas | Vapor volume | Heating gas volume | Volume of mixture | Temp. difference between heating gas and mixture |
|---|---|---|---|---|---|---|
| 800° F | 1,000° F. | 1,200° F. | 1 | 12 | 13 | 200° F. |
| 800° F | 1,000° F. | 1,400° F. | 1 | 6 | 7 | 400° F. |
| and further on the same basis | | | | | | |
| 800° F. | 1,000° F. | 1,800° F. | 1 | 3 | 4 | 800° F. |

In comparing the volume of the mixture with the difference between the heating gas temperature and the temperature of the mixture it is evident that these quantities are nearly inversely proportional.

It should be noted that the values for molecular weights and specific heats in the above illustration are purposely chosen so as to show the effect of increased heating gas temperatures on the volume of the mixture most disadvantageously. It is evident that the lower the mol. wt. and the sp. ht. of the vapors, and the higher the mol. wt. and the sp. ht. of the heating gases the less marked will be the decrease of volume of the mixture due to increase of heating gas temperature. The figures used in the above illustration, that is, mol. wt. of vapors 240 and specific heat .6 are minimum values, while a heating gas molecular weight of 40 with a specific heat of .3 are unquestionably high for the majority of gases suitable for the type of process here considered.

From the above illustration it may readily be deducted that heating gases of the highest possible temperature should preferably be used since the capacity of the process is considerably increased thereby, or, for equal capacity, zones F, A, B, G, H, I, and possibly E (Fig. 1) may be very substantially decreased in size. However, it was found that high heating gas temperatures caused the formation of excessive quantities of fixed gas as a product of the reaction zones. Due to this the operation of the type of process as outlined above has been limited to the use of relatively low heating gas temperatures (as a general statement I may say 1400 to 1500° F., or thereabout), and as a result the equipment of commercial units of this type of process has by necessity been very large relative to material handled, in fact so large as to make the process commercially unprofitable under all but the most favorable circumstances.

I have found that excessive fixed gas formation in this type of process is due to local and temporary overheating of portions of the vapor stream during the heat exchange which raises the hydrocarbon vapor to the high reaction temperatures. This pointed to the necessity of providing a special means or method of, for, combining the heating gas stream and the vapor stream whereby the temporary overheating would be minimized.

My invention prevents temporary overheating of portions of the vapor stream during the heat exchange to a very marked degree, and thus makes it possible to obtain full benefit from the use of very high heating gas temperatures.

The principle of direct contact heating is as follows: We are considering two streams of material, one of higher and one of lower temperature, which are to be directly combined to form a mixture at the desired (intermediate) temperature. When the two streams meet those portions of the colder stream which first come in contact with the hotter stream will be heated to temperatures higher than the ultimate temperature of the completed mixture, and will thus be subjected to excessive cracking conditions. Of course, the more nearly instantaneous the mixing of the two streams, the shorter the duration of the temporary overheating to which portions of the vapor stream are subjected, whereby the effects of overheating are reduced. With this in mind it might be thought that a specially designed apparatus which would cause very rapid mixing of the two streams should be a successful means of reducing the effects of temporary overheating. Investigation showed, however, that, at the prevailing high temperature conditions, and the comparatively large differential of temperature between the heating gases and the vapors, the mixing of the two streams took place so rapidly when simply brought together that it could hardly be improved upon by any mechanical method of mixing; from which it may be further concluded that the effect of temporary overheating as found is an inherent condition when the two streams are brought together, more or less irrespective of the rapidity of mixing by virtue of the fact that the mixing at all times takes place very rapidly under the prevailing temperature conditions.

As a feature of this invention, I have found that the effects of temporary overheating can be substantially reduced in the following manner. The heating gas stream may be subdivided into a multiplicity of smaller streams, and these small streams may then be successively added to the full stream of vapors. In this manner the total amount of heat which the heating gases are to impart to the vapor stream is imparted in a succession of small quantities, and each quantity of heat is quickly dissipated as it is added to the full stream of vapors; thus, temporary overheating is practically eliminated.

In the appended drawings, Fig. 2 shows a cross section of apparatus in which the above conditions are realized. It must be understood that, whereas I have found this design of apparatus to operate very successfully, it is not to be considered the only design capable of embodying the principle of my invention as stated.

Referring to Fig. 2, the mixing of the gases and the vapors takes place in a perforated cone A', constructed of a material of low heat conductive qualities. The vapor stream enters the cone at the small end B', and the heating gases, which are conducted to the cone through the jacket C', enter through the perforations in the wall of the cone. The mixture of vapors and gases leaves the cone through its large opening D', and from there is conducted to the succeeding zone in the process. This design incorporates substantially all the desired conditions. The full stream of vapors enters the cone at the small end, passes through it and leaves at the large end, while the heating gases are being added to the vapor stream (as it passes through the cone) successively in small streams through the perforations.

In keeping with the principle underlying this type of apparatus it is obviously advantageous to perforate the cone with a large number of holes of as small a diameter as is feasible with the practical construction of the apparatus and the operating conditions of the process. Also, the number and the diameter of the perforations should preferably be such that under the operating conditions to which the apparatus is subjected there will be a small pressure drop of the gases passing through them, to insure equal distribution.

The cone should preferably be constructed in such a manner that the conductivity of heat through its walls is kept at a minimum so that the vapors are not heated to any extent by contact with the cone, but the particular material or materials used for its construction form no part of my invention which merely requires, by preference, a low heat conductivity through the walls of the cone.

A further highly desirable condition occurring as a result of this method of combining the two streams may be pointed out as follows: I have mentioned that the many small streams of heating gases are successively added to the full stream of vapors. The fact is that only the first small stream is added to the full stream of vapors—each succeeding heating gas stream is added to the full stream of vapors plus the previously added heating gases. With this system of combining the two streams a small amount of temporary overheating will yet occur at the points of injection of each small heating gas stream, but only in the instant of the first small stream added will the overheating concern vapors exclusively, at each succeeding injection of heating gases the material overheated will be only in part vapor—the remainder being previously added heating gases. With each succeeding heating gas injection the material overheated will thus consist of an increasingly larger proportion of heating gases to vapors and, therefore, the amount of vapors overheated with each successive heating gas injection will be smaller and smaller.

In accordance with this condition it may be advantageous to add the heating gases in increasingly larger quantities rather than in an equally spaced succession. I have illustrated this diagrammatically in the appended drawings, Fig. 3, in which diagram A″ represents the addition of heating gases to the vapors or vapors plus heating gas stream in regular succession of equal quantities, while diagram B″ represents a condition whereby the quantity of heating gases added increases as the percentage of previously added heating gases in the mixture increases. It may readily be seen that the latter condition occurs in the apparatus shown in Fig. 2, but it must be understood that I do not wish to limit the scope of my invention to such particular arrangement.

In principle my invention requires that the heating gas stream be subdivided into a large number of smaller streams which are successively added to the full stream of vapors. As pointed out, it may be more accurate to change the wording of this statement to read as follows: That the heating gas stream is subdivided into a large number of smaller streams which are successively added to the full stream of vapors plus previously added heating gases. This is a more accurate description of the actual conditions since only the first small stream of heating gases is injected into a stream consisting of vapors alone.

I must point out, also, that in commercial practice it may at times be desirable to divide the vapor stream into two or more streams, each of which would pass through the type of apparatus claimed as my invention. This I have illustrated diagrammatically in Fig. 4. This method of operation does not differ in principle from the subject of my invention.

It was found that, with the use of the herein described method of combining the stream of gases and the stream of vapors, heating gas temperatures of 1700° F. and higher could be employed while producing from a typical gas oil over 60% motor fuel with a total liquid recovery of 85% or more. Under these conditions the capacity of the process was increased from approximately 40% to as high as 90% compared with operations without this type of combining apparatus when it was found necessary to use heating gases of much lower temperature and in much greater volume in order to maintain the liquid recovery at 85% or more, with a 60% motor fuel production.

The following is an illustrative run carried out under specific conditions by utilizing the concept of the present invention.

Gas oil having a gravity of approximately 32° Bé. produced from a Mid-continent crude may be pumped through line 1 into the zone A where approximately 95% of the gas oil will vaporize and will pass through line 3 into a conventional dephlegmator, zone B. Zone A will be maintained under a pressure of approximately 30 pounds. Conditions in zone B will be controlled so as to condense all fractions boiling above approximately 425° F. This condensate will comprise raw oil as well as an intermediate fraction produced in a manner to be presently described. The condensate from zone B is passed through lines 4 and 6 to and through the heating zone C where the temperature thereon is raised to approximately 890° F., pump 5 functioning to raise the pressure of the oil so that it has a pressure of approximately 100 pounds at the exit of the heating zone C. With this type of charging stock the separating zone D may be by-passed. The pressure is reduced by means of the valve on transfer line 8 to approximately 35 pounds, causing substantially complete vaporization.

The vapors are passed to zone X. At this point, heating gases at approximately 1800° F., and at approximately a four to one volumetric relationship of heating gas to hydrocarbon vapors, will be brought into direct contact with the vapors passing through line 8 into zone X, so that when the mixture of heating gases and hydrocarbon vapors are introduced into the time zone F, they will be at a temperature of approximately 1030° F.

The mixture of heating gases and vapors will traverse time zone F and should preferably pass through such time zone in from 2 to 4 minutes. The gaseous mixture then passes through pipe 10 into the zone A where the high boiling reaction products formed in the time zone are condensed due to heat exchange with raw oil. The heavier vapors entering zone A will condense therein to form a condensate amounting to approximately 15% based on the raw oil charge, and will be removed through line 2 together with 5% or less of the raw oil which does not vaporize. Vapors leave zone A through line 3, passing through zone B, as heretofore described. Vapors which remain uncondensed after passage through zone B pass through line 11 into zone G, which is a conventional type of cooler and collector. In zone G the vapors are condensed to substantially atmospheric temperature. The desired light final product of the process is withdrawn through line 12 and in this instance will consist of approximately 63% or more distillate based on raw oil charge. Non-condensible gas, together with the heating gases used for heating, pass from zone G to line 13. In the present instance the non-condensible gas will approximate 17%. This 17% includes a small percent of light condensible products which will be separated in the absorption zone I and recovered through line 15. In the present instance the amount recovered will be approximately 2½ to 5% based on the raw oil charge, making a total fixed gas production of approximately 12 to 14½%.

It is to be understood, of course, that the temperatures, pressures, yields and other specific conditions mentioned in the aforementioned run are merely illustrative, and I do not desire to limit the invention in any way to the exact conditions of temperature, pressure, yields, gravity of charging stock, etc., since these conditions will vary widely, and the process is applicable to the treatment of any type of charging stock.

To briefly summarize, I raise the average temperature of the heating gases from a range of between 1400 to 1500° F. to a range of approximately 1700 to 1800° F., or higher, thus substantially decreasing the volume of heating gases required for heating purposes. The advantages of reducing the volume of heating gases will be apparent when it is pointed out that one of the objections to direct contact heating of hydrocarbon vapors is the difficulty of subsequently separating the non-condensible gases from the condensible vapors, and another serious objection is the capital tied up in the large capacity apparatus required for handling the large volume of heating gases heretofore required.

I claim as my invention:

1. In the vapor phase cracking of hydrocarbon oils, the method which comprises passing a flowing stream of the vapors through a mixing zone surrounded by heating gases at a temperature substantially in excess of the cracking temperature of the vapors, interposing between the flowing stream of vapors and the heating gases a wall of low heat conductivity to substantially prevent indirect transfer of heat from the gases to the vapors, passing the heating gases through said wall under pressure into the mixing zone and introducing the same into the vapor stream at spaced points in progressively increasing amounts in the direction of flow of the vapors through the mixing zone, the total amount of gases thus introduced to the vapors being sufficient to raise the latter to vapor phase cracking temperature, discharging the resultant mixture of vapors and gases from the mixing zone into a reaction zone and maintaining the same therein under a pressure not in excess of that prevailing in the mixing zone for a time period adequate to crack a substantial portion of the vapors into gasoline-like hydrocarbons, removing the mixture from the reaction zone upon completion of said time period, and recovering the gasoline-like hydrocarbons from the mixture by dephlegmation and condensation.

2. In the vapor phase cracking of hydrocarbon oil, the method which comprises passing a flowing stream of the vapors through a mixing zone, maintaining contiguous to said mixing zone a supply of heating gases at a temperature substantially in excess of the cracking temperature of the vapors, substantially preventing indirect transfer of heat from the gases to the vapors by interposing therebetween a wall of low heat conductivity, forcing the heating gases through said wall and introducing progressively increasing amounts thereof to the vapors at spaced points in the direction of flow of the vapor stream through the mixing zone, the total amount of gases thus introduced to the vapors being sufficient to raise the latter to vapor phase cracking temperature, discharging the resultant mixture of vapors and gases from the mixing zone into a reaction zone and maintaining the same therein under a pressure not in excess of that prevailing in the mixing zone for a time period adequate to crack a substantial portion of the vapors into gasoline-like hydrocarbons, removing the mixture from the reaction zone upon completion of said time period, and recovering the gasoline-like hydrocarbons from the mixture by dephlegmation and condensation.

3. A hydrocarbon oil cracking process which comprises vaporizing the oil and passing the resultant vapors through a mixing zone in a flowing stream of gradually increasing cross-section, independently generating heating gases at a temperature substantially in excess of the cracking temperature of the vapors, causing the heating gases to surround the vapor stream flowing through the mixing zone while substantially preventing indirect heat transfer from the former to the latter by interposing a wall of low heat conductivity between the vapors and gases, combining the gases with the vapors by passing the same through said wall and introducing progressively increasing amounts thereof to the vapors at spaced points in the direction of flow of the vapor stream through the mixing zone, the total amount of gases thus introduced to the vapors being sufficient to raise the latter to vapor phase cracking temperature, discharging the resultant mixture of vapors and gases from the mixing zone into a reaction zone and maintaining the same therein under a pressure not in excess of that prevailing in the mixing zone for a time period adequate to crack a substantial portion of the vapors into gasoline-like hydrocarbons, removing the mixture from the reaction zone upon completion of said time period and recovering the gasoline-like hydrocarbons from the mixture by dephlegmation and condensation.

4. In the vapor phase cracking of hydrocarbon oils, the method which comprises passing a flowing stream of the vapors through a mixing zone, combining with the vapors heating gases at a temperature substantially in excess of the cracking temperature of the vapors by introducing progressively increasing amounts of the gases to the vapors at spaced points in the direction of flow of the vapor stream through the mixing zone, the total amount of gases thus introduced to the vapors being sufficient to raise the latter to vapor phase cracking temperature, discharging the resultant mixture of vapors and gases from the mixing zone into a reaction zone and maintaining the same therein under a pressure not in excess of that prevailing in the mixing zone for a time period adequate to crack a substantial portion of the vapors into gasoline-like hydrocarbons, removing the mixture from the reaction zone upon completion of said time period, and recovering the gasoline-like hydrocarbons from the mixture by dephlegmation and condensation.

5. In the vapor phase cracking of hydrocarbon oil, the method which comprises passing a flowing stream of the vapors through a mixing zone, maintaining contiguous to said mixing zone a supply of heating gases at a temperature substantially in excess of 1500° F., sustantially preventing indirect transfer of heat from the gases to the vapors by interposing therebetween a wall of low heat conductivity, forcing the heating gases through said wall and introducing the same to the vapors at spaced points in the direction of flow of the vapor stream through the mixing zone, the total amount of gases thus introduced to the vapors being sufficient to raise the latter to vapor phase cracking temperature, discharging the resultant mixture of vapors and gases from the mixing zone into a reaction zone and maintaining the same therein under a pressure not in excess of that prevailing in the mixing zone for a time period adequate to crack a substantial portion of the vapors into gasoline-like hydrocarbons, removing the mixture from the reaction zone upon completion of said time period, and recovering the gasoline-like hydrocarbons from the mixture by dephlegmation and condensation.

In testimony whereof I affix my signature.

ROBERT PYZEL.